US008265777B2

(12) United States Patent
Liu et al.

(10) Patent No.: US 8,265,777 B2
(45) Date of Patent: Sep. 11, 2012

(54) PERVASIVE MODEL ADAPTATION: THE INTEGRATION OF PLANNING AND INFORMATION GATHERING IN DYNAMIC PRODUCTION SYSTEMS

(75) Inventors: Juan Liu, Milpitas, CA (US); Johan de Kleer, Los Altos, CA (US); Lukas D. Kuhn, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 473 days.

(21) Appl. No.: 12/498,943

(22) Filed: Jul. 7, 2009

(65) Prior Publication Data
US 2011/0009996 A1    Jan. 13, 2011

Related U.S. Application Data

(60) Provisional application No. 61/183,440, filed on Jun. 2, 2009.

(51) Int. Cl.
  *G05B 13/02* (2006.01)
  *G06F 19/00* (2006.01)
(52) U.S. Cl. .............. 700/31; 700/29; 700/103
(58) Field of Classification Search .......... 700/29, 700/31, 103
See application file for complete search history.

(56) References Cited

U.S. PATENT DOCUMENTS

| | | | |
|---|---|---|---|
| 6,519,552 B1 * | 2/2003 | Sampath et al. | 702/183 |
| 7,424,331 B2 * | 9/2008 | Patel | 700/31 |
| 2010/0010654 A1 * | 1/2010 | de Kleer et al. | 700/97 |
| 2010/0010657 A1 * | 1/2010 | Do et al. | 700/103 |
| 2010/0010845 A1 * | 1/2010 | Kuhn et al. | 705/7 |
| 2010/0010952 A1 * | 1/2010 | Kuhn et al. | 706/47 |
| 2010/0241251 A1 * | 9/2010 | Kuhn et al. | 700/31 |

OTHER PUBLICATIONS

Harold W. Sorenson, "Kalman Filtering Theory and Application", IEEE Press.
Herbert E. Rauch, "Autonomous Control Reconfiguration", IEEE, Dec. 1995.
Yong-Wha-Kim, Giorgio Rissoni, and Vidha Utkin, "Automative Engine Diagnosis and Control via Nonlinear Estimation", 1998 IEEE.
Leto Peel, "Data Driven Prognostics Using a Kalman Filter Ensemble of Neutral Models", 2008 IEEE.
Blai Bonet and Hector Geffner, "Planning with Incomplete Information as Heuristic Search in Belief Space", American Association for Artificial Intelligence, 2000.
Johan De Kleer and Brian C. Williams, "Diagnosing Multiple Faults", Artificial Intelligence, 1987, pp. 97-130, Elsevier Science Publishers B.V.
Richard Dearden and Dan Clancy, "Particle Filters for Real-Time Fault Detection in Planetary Rovers", Research Institute for Advanced Computer Science, NASA Ames Research Center.

(Continued)

*Primary Examiner* — Ryan Jarrett
(74) *Attorney, Agent, or Firm* — Fay Sharpe LLP

(57) ABSTRACT

A computer-based method and system for pervasive model adaptation are provided. The method includes providing a production plan to a production system, executing the production plan in the production system, collecting observation data produced by at least one sensor in the production system during execution of the production plan into computer memory, calculating changes to be made to a system model in the computer memory based on the collected observation data, dynamically updating the system model according to the calculated changes, creating an updated production plan based at least partially on the dynamically updated system model, and storing the updated production plan within the computer memory.

8 Claims, 10 Drawing Sheets

OTHER PUBLICATIONS

Minh Do and Wheeler Ruml, "Lessons Learned in Applying Domain-Independent Planning to High-Speed Manufacturing", American Association for Artificial Intelligence, 2006.

R.E. Kalman, "A New Approach to Linear Filtering and Prediction Problems", Transactions of the ASME-Journal of Basic Engineering, 82 (Series D): 35-45, 1960.

Lukas Kuhn, Tim Schmidt, Bob Price, Johan De Kleer, Rong Zhou and Ming Do, "Heuristic Search for Target Value Path Problem", pp. 76-83.

Lukas Kuhn, Bob Price, Johan De Kleer, Minh Do and Rong Zhou, "Pervasive Diagnosis" the integration of active diagnosis into production plans, Association for the Advancement of Artificial Intelligence, 2008. Proceedings of 23rd AAAI Conf. on AI (Jul. 13-17, 2008).

Juan Liu, Johan De Kleer, Lukas Kuhn, Bob Price, and Rong Zhou, "A Unified Information Criterion for Evaluating Probe and Test Selection".

Gregory Provan and Yi-Lian Chen, "Model-Based Diagnosis and Control Reconfiguration for Discrete Event Systems: An Integrated Approach", Proceedings of the 38th Conference on Decision & Control, Phoenix, Arizona, Dec. 1999, IEEE.

Wheeler Ruml, Minh B. Do and Markus P.J. Fromherz, "On-line Planning and Scheduling for High-speed Manufacturing", American Association for Artificial Intelligence, 2005.

David E. Smith and Daniel S. Weld, "Conformant Graphplan", AAA1-98 Proceedings, 1998.

\* cited by examiner

PERVASIVE MODEL ADAPTATION: THE INTEGRATION OF PLANNING AND INFORMATION GATHERING IN DYNAMIC PRODUCTION SYSTEMS

This application claims the benefit of priority to U.S. Provisional Patent Application No. 61/183,440, filed Jun. 2, 2009, entitled "Pervasive Model Adaptation: Integration of Planning and Information Gathering in Dynamic Production Systems", by Juan Liu et al., the disclosure of which is hereby incorporated by reference in its entirety.

BACKGROUND

The present exemplary embodiments relate to pervasive model adaptation in production systems. In such systems, automated model adaptation of system performance and component status can advantageously aid in improving productivity, identifying faulty or underperforming resources, scheduling repair or maintenance, etc. Accurate model adaptation requires information about the true condition of components in the production system. Such information can be obtained directly from sensors associated with individual components and/or may be inferred from a limited number of sensor readings within the production system using a model or other knowledge of the system structure and dynamics. Providing complete sensor coverage for all possible system faults can be expensive or impractical in harsh production environments, and thus it is generally preferable to instead employ model adaptation procedures to infer the source of faults detected or suspected from limited sensors.

System model adaptation information is typically gathered by one of two methods, including dedicated or explicit model adaptation with the system being exercised while holding production to perform tests and record observations without attaining any production, as well as passive model adaptation in which information is gathered from the system sensors during normal production. Although the latter technique allows inference of some information without disrupting production, the regular production mode may not sufficiently exercise the system to provide adequate model adaptation information to improve long term productivity. Moreover, while dedicated model adaptation operation generally provides better information than passive model adaptation, the cost of this information is high in terms of short term productivity reduction, particularly when diagnosing recurring intermittent system component failures that require repeated model adaptation interventions.

Conventional production model adaptation systems are thus largely unable to adequately yield useful model adaptation information without halting production and incurring the associated costs of system down-time, and are therefore of limited utility in achieving long term system productivity. Accordingly, there exists a need for improved control systems and techniques by which both long term and short term productivity goals can be achieved in production systems having only limited sensor deployment.

BRIEF DESCRIPTION

In one aspect, a computer-implemented method for pervasive model adaptation is provided. The method includes providing a production plan to a production system, executing the production plan in the production system, collecting observation data produced by at least one sensor in the production system during execution of the production plan into computer memory, calculating changes to be made to a system model in the computer memory based on the collected observation data, dynamically updating the system model according to the calculated changes, creating an updated production plan based at least partially on the dynamically updated system model, and storing the updated production plan within the computer memory.

In another aspect, a computer-based system for pervasive model adaptation is provided. The system includes a processor for controlling operation of the system; a model adaptation engine configured to receive observation data produced by at least one sensor of a production system, and to calculate changes to be made to a system model of the production system based on the received observation data from the production system; a system model module adapted to dynamically update the system model based on the calculated changes from the model adaptation engine; and a planner module adapted to update a production plan based at least partially on the updated system model from the system model module.

DETAILED DESCRIPTION

Aspects of the present exemplary embodiment relate to a system and method for pervasive model adaptation with respect to production plans and production systems. Generally, production plans are provided to production systems to optimize productivity. However, production systems tend to change over time and production plans must occasionally be optimized for non-productivity purposes, such as for detecting problems and change in the production system. However, productivity is lost when the information gathering production plans are performed. The present exemplary embodiment creates production plans for a production system that maintain high productivity rates, while at the same time gathers information about the production system for the purpose of updating future productivity planning and reducing uncertainty with respect to production system components.

Figure 1:
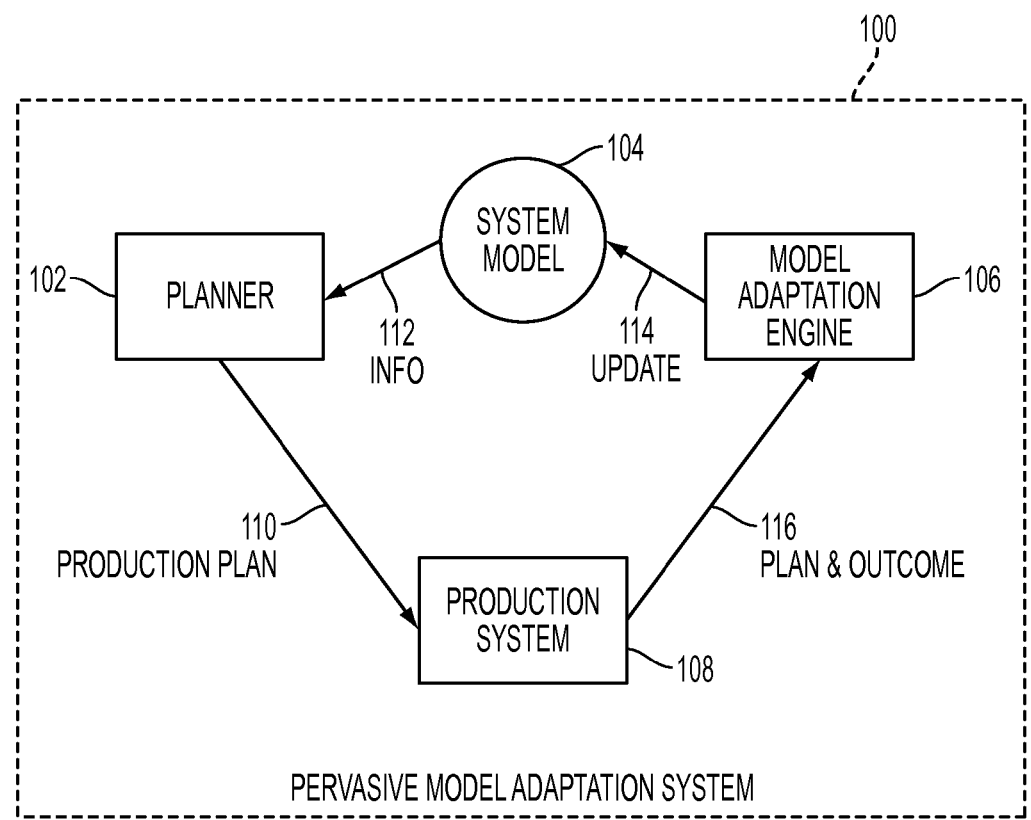
FIG. 1 is a high-level overview of an exemplary system for pervasive model adaptation; included in the system is a production system, system model, model adaptation engine, and a planner.

With reference to FIG. 1, an exemplary pervasive model adaptation system 100 is described. In a general sense, pervasive model adaptation system 100 includes a planner 102, a system model 104, and a model adaptation engine 106 that operate with respect to a "real world" physical system 108. The planner 102 is adapted to create production plans 110 that achieve two goals substantially simultaneously: (1) high productivity by the physical system 108, and (2) the ability to gather information 116 about the physical system 108 in order to facilitate model adaptation in the model adaptation engine 106. The model adaptation engine 106 is adapted to update the system model 104 with updated state parameters 114 based on the output 116 of the physical system 108. The system model 104 is a representation of what is believed to be true about the physical system 108. The system model 104 is not the physical system 108 itself, but is a "belief model" about the physical system 108. The system model 104 is dynamic in that it continually changes based on updated information 114 from the model adaptation engine 106.

Conceptually, the planning performed by the planner 102 can be thought of as the generic problem of finding an optimal plan with respect to a given cost function or optimality criterion. In traditional planning, the cost function of certain structures is assumed to be one of multiple cost functions. For instance, the cost function may be additive over plan components, decomposable into locally optimal subsets, or invariant with respect to component ordering in the plan. These cost functions enable efficient computation via known algorithms such as A*-search or dynamic programming. In pervasive model adaptation, the integration of production plans and model adaptation results in informative plans, where the cost function is the information content. A production plan is favorable if its output maximally reduces uncertainty in the system model.

Figure 2:
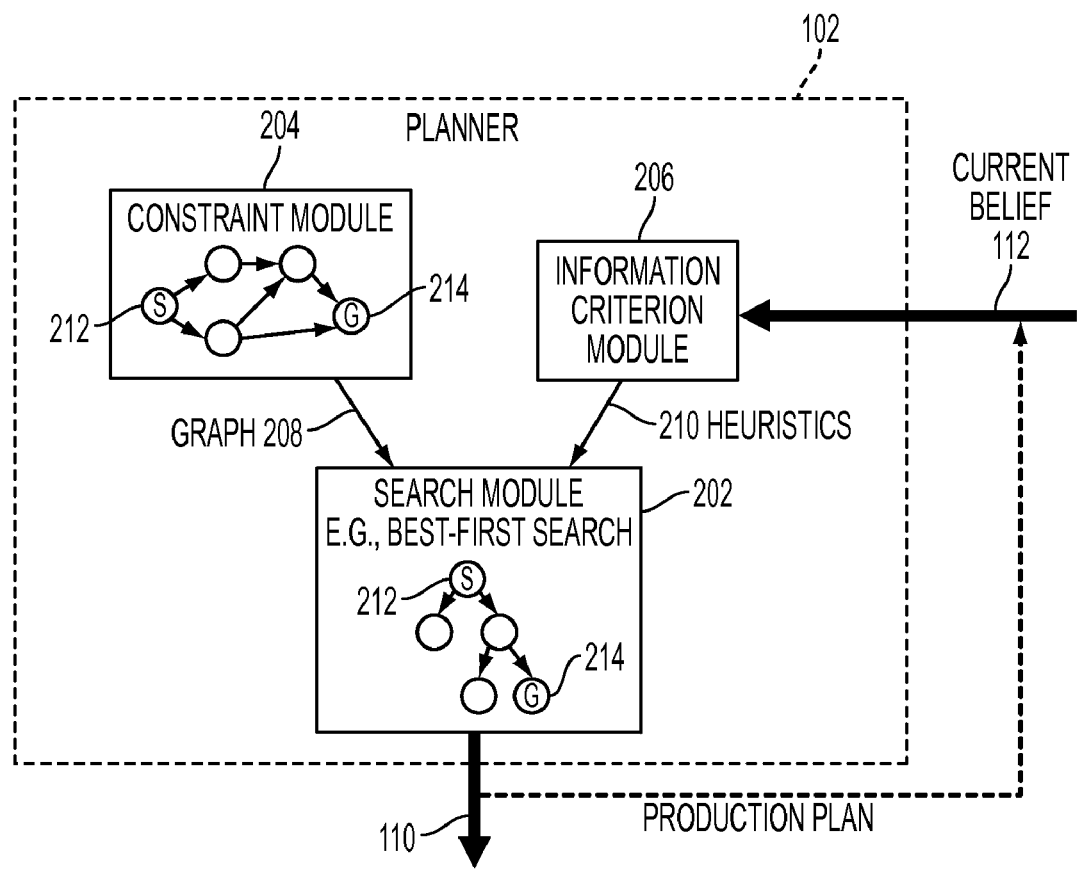
FIG. 2 is a detailed view of the planner from FIG. 1; included in the planner is a constraint module, information criterion module, and a search module.

With reference to FIG. 2, the planner 102 of the pervasive model adaptation system 100 of FIG. 1 is described in more detail. As discussed above, the planner 102 is adapted to create production plans 110 that enable high productivity by the physical system (FIG. 1, 108) and enable the model adaptation engine (FIG. 1, 106) to gather information about the physical system (FIG. 1, 108) and adapt the system model (FIG. 1, 104) accordingly. The planner input 112 includes a current state or "belief" (e.g., an estimate and uncertainty) of the physical system (FIG. 1, 108) based on the system model (FIG. 1, 104). The planner output 110 is a production plan optimized for both production and learning goals.

The planner 102 itself is comprised of several components, including an information criterion module 206, a constraint computation module 204, and a search module 202.

The information criterion module 206 provides a set of heuristics (rules or criterion) 210 to the search module 202 which allows the search module 202 to evaluate the information content that any given production plan P may ultimately provide to the model adaptation engine (FIG. 1, 106). The output 210 of the information criterion module 206 depends on the current belief input 112, with the current belief input 112 being a representation of the underlying physical system (FIG. 1, 108) provided by the system model (FIG. 1, 104). This criterion is specific to pervasive model adaptation, and is distinctively different from traditional production planning, which uses well-understood criterion such as shorted production time or maximal throughput instead of adjusting the criterion dynamically as the system model (FIG. 1, 104) changes.

The system constraint module 204 creates a directed graph 208 based on internal constraints of the physical system 108, such as contingency and connectivity. The directed graph 208 is then used by the search module 202 to construct a production plan 110. A production plan 110 is a path on the directed graph 208 from a known initial state 212 (e.g., raw material for production) to a known goal state 214 (e.g., finished product).

The search module 202 performs a search on the input directed graph 208 for an optimal feasible path with respect to the information criterion 210. As explained below, the information content of any given path P depends on all all the components (states) in P, which makes the search a problem of exponential complexity. The challenge is thus to find a computationally efficient search strategy which gives a informative plan. In one embodiment a best-first search strategy (A*) is used. The best-first algorithm maintains a moving frontier of promising partial plans (those anticipated to produce informative plans), and expands the partial plans with highest anticipated information content until the goal state 214 is reached. The search module 202 determines which heuristics 210 are to be used to guide the search. More detail on how the information criterion is used to generate such heuristics is shown below.

The dynamic nature of production systems 108 adds substantial complexity to the planner algorithm. For instance, when a component of a production system 108 gets older, its behavior may deviate from the original model, and hence there is the need to track component behavior over time via learning. This means that the planner 102 is dynamic: given the belief at time t, the planner 102 plans for the next optimal (or close-to-optimal) path $P^{(t)}$, which will produce an output that modifies the belief 112. The modified belief is fed back to the planner at time (t+1) after the plan has been performed by the production system 108.

Figure 3:
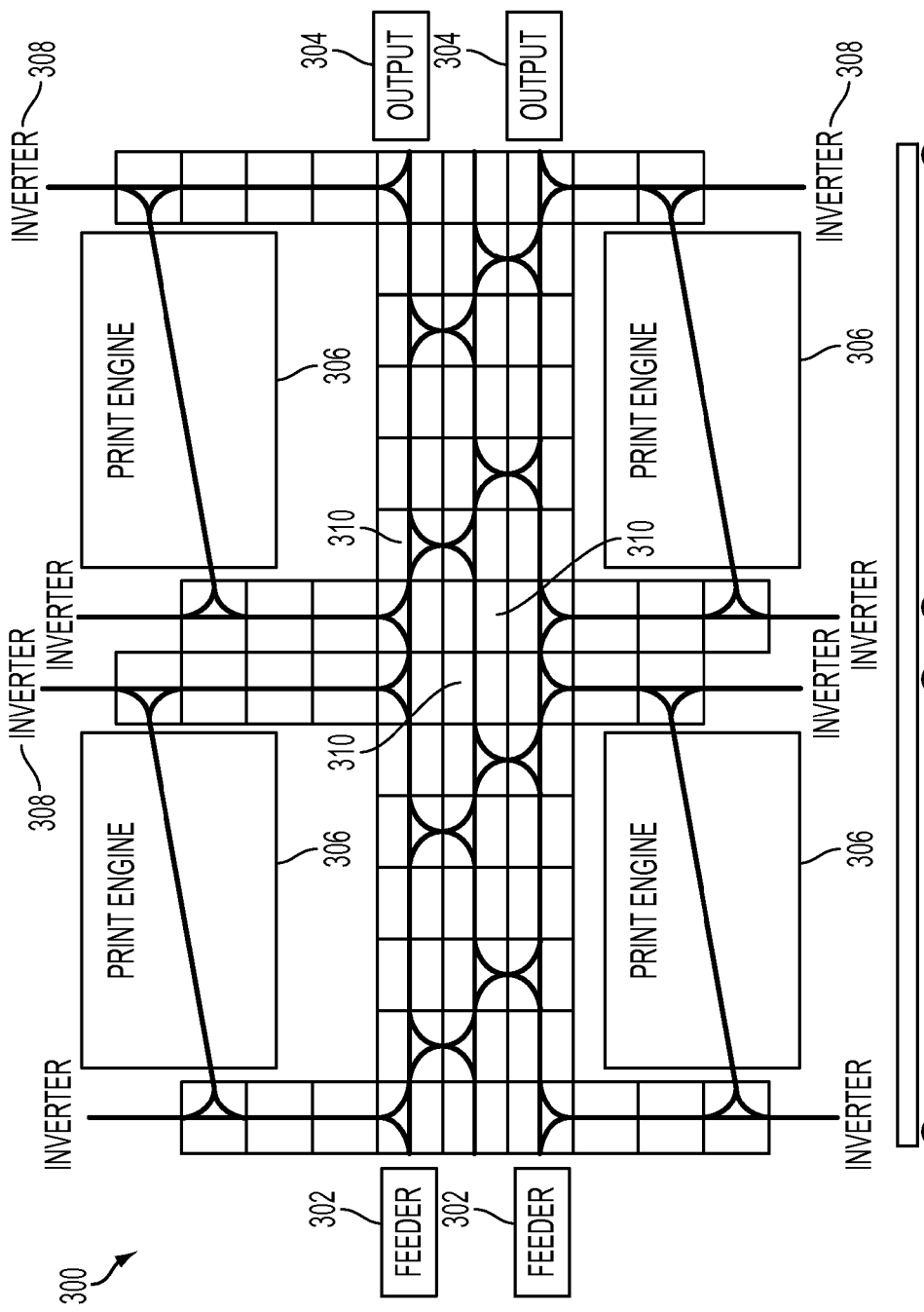
FIG. 3 illustrates an example production system, i.e., a printing system.

With reference to FIG. 3, an example printing system using pervasive model adaptation is described.

A modular printer 300 is given as a concrete example to illustrate issues in pervasive model adaptation. At a first step, paper sheets enter the printer 300 on the left from one of the feeders 302 and exit on the right from a paper finisher (or output) 304, going through multiple stages in between, such as print engines 306, inverters 308, and paper path modules 310 (represented by little squares in FIG. 3). The modularized structure enables the printer 300 to print continuously even if some of the printer engines 306 fail or paper path modules 310 malfunction (i.e. paper jams). The task of the planner (FIG. 1, 102) is to find the sequence of actions, called a "plan," which will move sheets through the printing system 300 to generate the requested output, while at the same time, generating useful information that can be used by the model adaptation engine (FIG. 1, 106) to update the system model (FIG. 1, 104).

In this printing system, each action (i.e., a step in the plan) i takes some time $\theta_i$ to handle the paper sheet, known as the action delay. Over time, the modules 306, 308, 310 will degrade as, for example, mechanical components (springs, rollers, etc) wear out through normal wear and tear. As a result, action delays $\{\theta_i(t)\}$ normally increase. A model-based planner will not work if it assumes a static image of action delays. For instance, a plan requiring a paper sheet to go from feeder to finisher within a pre-specified amount of time is feasible when the machine is new, but may become infeasible later due to the normal degradation of the components over time. Hence, it is important to keep track of these actions delays for the production system 108.

To track the drift of model parameters (states), two items are required: (1) a dynamics model specifying how the underlying states (in this case, action delays) evolve over time, and (2) an observation likelihood model relating observations to the underlying state. The dynamics model is as follows:

$$\theta_i(t) = \begin{cases} \theta_i(t-1) + \delta_i + w_i(t) & \text{for } i \in P \\ \theta_i(t-1) + w_i(t) & \text{for } i \notin P \end{cases} \quad (1)$$

The action delay $\theta_i(t)$ is influenced by two factors: (1) a wear-related increment $\delta_i$ if module i is used in plan P, and zero otherwise, and (2) a random drift $w_i(t)$. The observation is the total process time summed over all modules in the production and a random observation noise n(t) as shown in the following observation model:

$$y(t) = \sum_{i \in P} \theta_i(t) + n(t) \quad (2)$$

Furthermore, it is assumed that the delay increment $\delta_i$ is known a priori. In certain embodiments, $\delta_i$ may be learned prior to or concurrently with the implementation of the exemplary method and system.

Although this example is specific in modular printing, the concept of pervasive model adaptation is general and applicable to a variety of problems. For instance, the same concepts can be used in printed circuit manufacturing, in which actions contribute to the etching process by depositing material (acid or like) to the metallic substrate. The observed etched depth in the metallic foil is the total effect of all involved actions. More generally, the techniques presented here can be directly extended to any system with linear dynamics and observation models. At a conceptual level, equation (1) describes different drift patterns for modules involved and not involved in a particular plan P, and equation (2) describes an observation model that relates the observation to model parameters. As long as they are both linear, the techniques described here is applicable, although the detailed mathematical form may change. In practice, many systems can be well-represented by a linear model. Linearization techniques have been widely used to approximate real-world systems.

Figure 4:
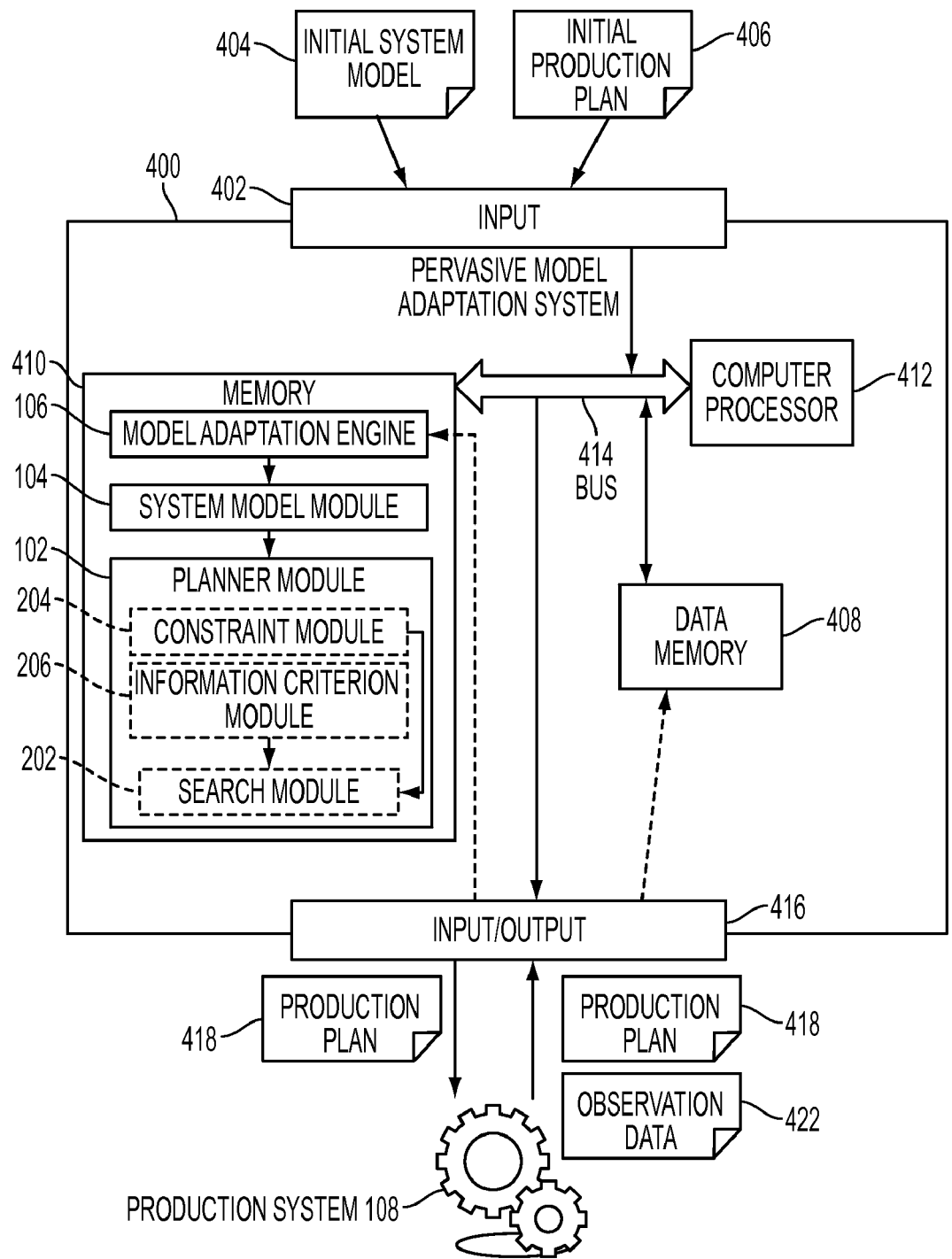
FIG. 4 illustrates the working components of a pervasive model adaptation computer system.

With reference to FIG. 4, an exemplary pervasive model adaptation system 400 is described. The system 400 includes an input device 402, for receiving an initial system model 404 and an initial production plan 406. Prior to inputting, the initial system model 404 and initial production plan 406 may be stored in any suitable tangible media such as a ROM or RAM drive or may be input into the system in the form of a carrier wave, e.g., via the Internet or a LAN. Alternatively, the initial system model 404 and initial production plan 406 is generated within the computing device 400, itself. The input may include a modem link, a wired or wireless connection, USB port, floppy or hard disk receiver, or the like.

The system 400 includes data memory 408 for use during the processing of the initial system model 404 and initial production plan 406. Main memory 410 of the system stores a model adaptation engine 106, system model module 104, and a planner module 102 which contains a constraint module 204, information criterion module 206, and a search module 202. The model adaptation engine 106 updates the system model 104 with updated state parameters based on the sensor readings of production system 108. The system model module 104 updates the system model based on information received from the model adaptation engine 106. The system model itself may be stored in the system model module or in any other area accessible by the system model module 104. The system model 104 is a representation of what is believed to be true about the production system 108. The planner module 102 creates production plans that enable high productivity by the production system 108 and enable the model adaptation engine to gather information about the production system 108 in order to facilitate model adaptation. Within the planner 102, the constraint module 204 creates a directed graph based on known internal constraints of the production system 108, such as contingency and connectivity. The information criterion module 206 provides a set of heuristics (rules or criterion) to the search module 202 based upon the input "current belief" from the system model 104. For instance, the heuristics may show that the information that would be gained ($\epsilon$ of equation (6) below) by one path P1 is greater than the information that would be gained by a different path P2. The search module 202 receives the heuristics from the information criterion module 206 and the directed graph from the constraint module 204. The search module 202 then performs a search on the input directed graph for an optimal feasible path that produces the best production results as well as the best information for the system model module 104.

The model adaptation engine 106 and modules 104, 102, 204, 206 and 202 may be implemented as hardware or software or a combination thereof. In the exemplary embodiment, the components 102, 104, 106, 202, 204, 206 comprise software instructions stored in main memory 410, which are executed by a computer processor 412. The processor 412, such as a computer's CPU, may control the overall operation of the computer system by execution of processing instructions stored in memory 410. Components 410, 408, 412 of the computer system may be connected by a data control bus 414.

The system 400 includes an input/output device 416, which outputs processed data, such as a production plan 418. The exemplary output device 416 is linked by a wired or wireless link to a production system 108. The production system 108 may input one or more of a production plan 418 and observation data 422 to the pervasive model adaptation system 400 after it has run a production plan 418.

As will be appreciated, the pervasive model adaptation system 400 may comprise one or more computing devices, such as a personal computer, PDA, laptop computer, server computer, or combination thereof. Memories 408, 410 may be integral or separate and may represent any type of computer readable medium such as random access memory (RAM), read only memory (ROM), magnetic disk or tape, optical disk, flash memory, or holographic memory. In one embodiment, the memories 408, 410 comprise a combination of random access memory and read only memory. In some embodiments, the processor 412 and memory 408 and/or 410 may be combined in a single chip.

Figure 5:
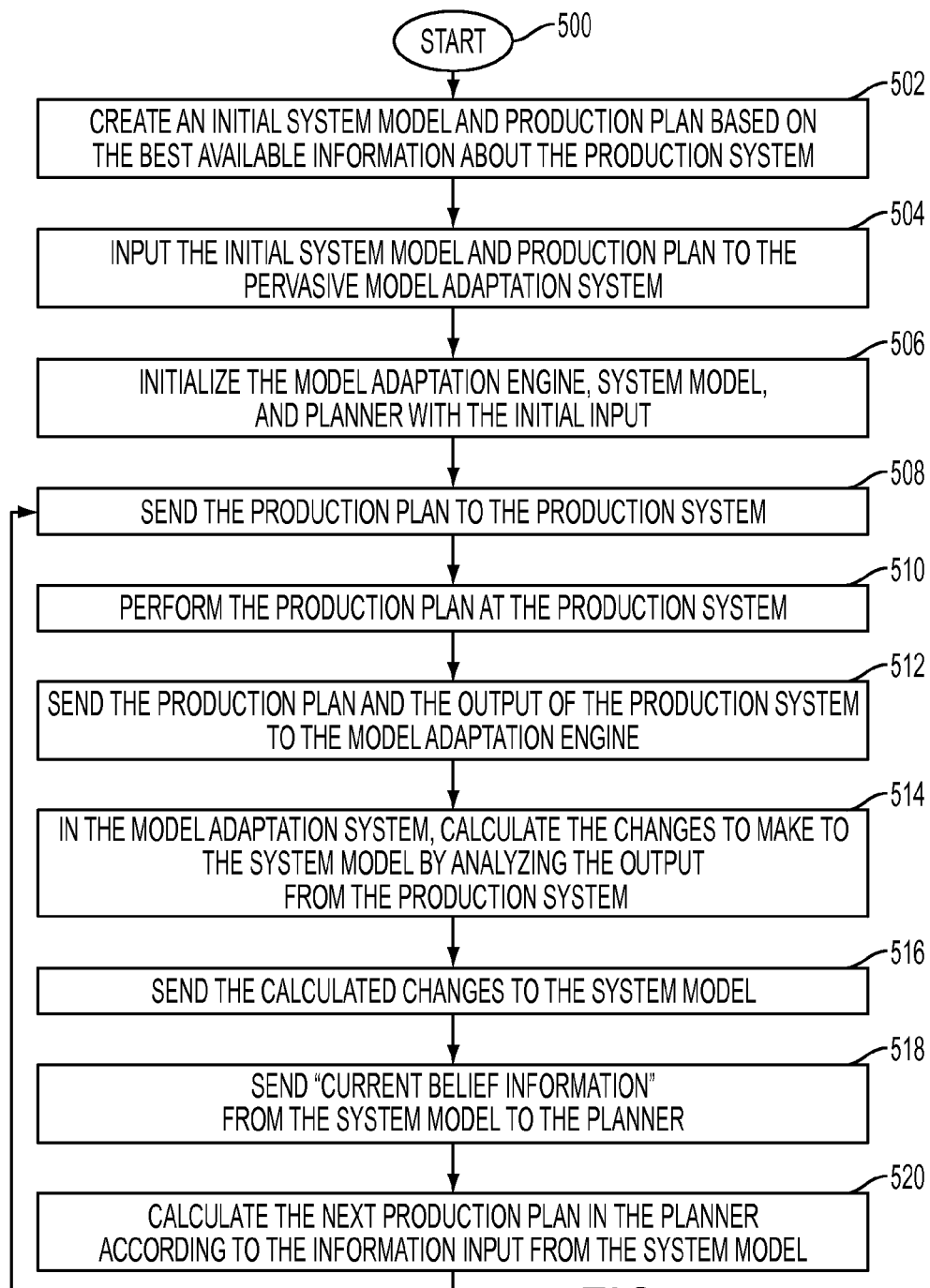
FIG. 5 is a flow diagram illustrating a method for pervasive model adaptation, adapted to use the system of FIG. 4.

With reference to FIG. 5, an exemplary pervasive model adaptation method is described. The method may be performed on the exemplary system detailed in FIG. 4. The method begins at step 500.

At step 502, an initial system model 400 and initial production plan 430 is created. The initial system model 400 and production plan 430 are based upon the best available information about the production system 108. Even if the system model 400 is incorrect, it will be corrected over time after multiple iterations.

At step 504, the initial system model 400 and initial production plan 430 are provided to the input 402 (if they have not already been created and stored in the system 404).

At step 506, the model adaptation engine 106, system model module 104, and planner module 102 are all initialized with the values given in the input initial system model 400 and initial production plan 430. During this initialize phase, the modules 106, 104, and 102 will not make any changes to the initial system model 400 or initial production plan 430.

At step 508, the production plan 432 created by the planner module 102 is sent via the input/output device 424 to the production system 108.

At step 510, the production system 108 performs the production plan 432 created by the planner module 102. Sensors located in the production system 108 collect observation data while the production plan 432 is being performed.

At step 512, the production system 108 sends the observation data 434 and (optionally) the production plan 432 back to the pervasive model adaptation system 404 by way of the input/output device 424. It is assumed that if the production plan 432 is not sent back to the pervasive model adaptation system 404, then the system 404 will assume that the last generated production plan 432 was used to create the observation data 434.

At step 514, the input 432, 434 from the production system is transferred into memory 406, 428 via bus 422. The model adaptation engine 106 then processes the input data 432, 434 and calculates changes to make to the system model 104.

At step 516, the model adaptation engine 106 sends the calculated changes (FIG. 1, 114) to the system model module 104.

At step 518, the system model module 104 updates the system model and sends the system model (i.e. "current belief") (FIGS. 1-2, 112) to the planner module 102.

At step 520, the planner creates a new production plan 432 based at least partially on the current belief 112 provided by the system model module 104. The method then loops back to step 508 and continues.

The method illustrated in FIG. 5 may be implemented in a computer program product that may be executed on a computer. The computer program product may be a tangible computer-readable recording medium on which a control program is recorded, such as a disk or hard drive. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other medium from which a computer can read and use. Alternatively a transmittable carrier wave may be provided in which the control program is embodied as a data signal, e.g., transmission media, such as acoustic or light waves, such as those generated during radio wave and infrared data communications, and the like. The initial system model and production plan may also be embodied in one or more of such tangible media.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device capable of implementing a finite state machine that is in turn capable of implementing the flowchart shown in FIG. 5 can be used to implement the method for pervasive model adaptation.

Figure 6:
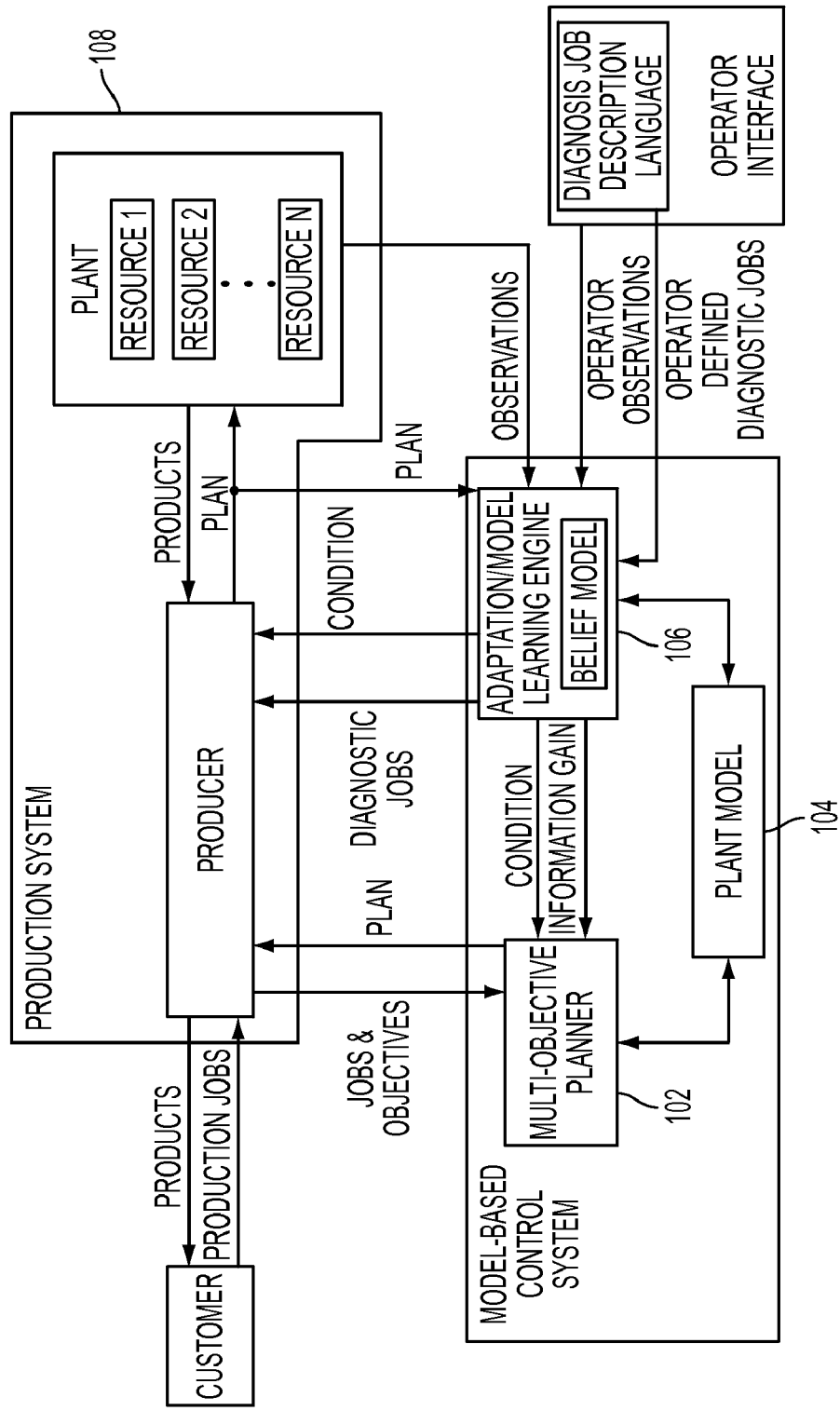
FIG. 6 shows a schematic of a physical production system and illustrates how the pervasive model adaptation system of FIG. 1 is implemented within the physical production system.

With reference to FIG. 6, a production system capable of generating a variety of manufactured items and a model-based control system is shown, with the corresponding modules of the exemplary embodiment labeled for illustration purposes. The production system of FIG. 6 correlates with the production system 108 of the exemplary embodiment. The multi-objective planner, plant model, and model adaptation engine of FIG. 6 correlate with the planner 102, system model 104, and model adaptation engine 106, respectively, of the exemplary embodiment described in FIG. 1.

Further details of the system and method of the present application will now be described.

1. Information Criterion

The goal of model adaptation is to estimate the underlying model parameters (action delay $\{\theta_i(t)\}$ in the example) from the production plan output y(t). The key question is: which production path P works best to track the drift in action delay parameters? This can be addressed by examining the uncertainty in delay parameters, i.e., a production plan P is "informative," if its observation y(t) reduces the uncertainty.

1.1 Information Content

For convenience in expression, the vector notation $\Theta(t)=(\theta_1(t),\theta_2(t),\ldots,\theta_M(t))$ is used. The models (1) and (2) can be re-written as:

$$\Theta(t)=\Theta(t-1)+\Delta(t-1)+w(t) \quad (3)$$

$$y(t)=H\Theta(t)+n(t) \quad (4)$$

Here, H is a binary indicator vector indicating whether an action i is included in the path P, i.e., $H_i=1$ for all $i \in P$, and 0 otherwise. $\Delta$ is the vector of increment: $\Delta=(\delta_1 H_1, \delta_2 H_2, \ldots, \delta_M H_M)^T$. For simplicity, it is further assumed that process noise w(t) and observation n(t) are Gaussian. Under these assumptions, the tracking problem is relatively simple and can be tracked optimally using a Kalman filter.

A Kalman filter updates the uncertainty in $\Theta(t)$, i.e., the covariance matrix $R_\theta^t$ recursively over time. The recursion is as follows. Suppose at time t−1, $R_\theta^{t-1}$ is given. The uncertainty grows due to the drift w. It is easy to show that the predicted covariance at time t is dilated by drift covariance $\overline{R_\theta^t}=R_\theta^{t-1}+\Sigma_w$. Then a new observation y(t) is made, bringing information to reduce the uncertainty. This shrinks the uncertainty down: $R_\theta^t=(I-KH)\overline{R_\theta^t}$ where K is the kalman gain which can be derived from H and $\overline{R_\theta^t}$. The recursion then repeats. The Kalman filter oscillates between such uncertainty expansion and reduction. One well-known way to quantify the uncertainty is the trace of the covariance matrix trace($R_\theta^t$). It is straightforward to show (following the standard Kalman filter algebra) that for any given production plan H:

$$\text{trace}(R_\theta^t) = \text{trace}(\overline{R_\theta^t}) - \frac{\|H\overline{R_\theta^t}\|^2}{H\overline{R_\theta^t}H^T + \sigma_n^2} \quad (5)$$

Note that the firm term trace($\overline{R_\theta^t}$) is a constant regardless of the choice of plan H. Therefore, to minimize the uncertainty, the information content (to be maximized) is defined as $$\varepsilon = \text{trace}(\overline{R_\theta^t}) - \frac{\|H\overline{R_\theta^t}\|^2}{H\overline{R_\theta^t}H^T + \sigma_n^2} \quad (6)$$

Also note that the information depends on the predicted covariance $\overline{R_\theta^t}$. Here, $\sigma_n$ is the standard deviation of measurement noise n.

Another way to derive the information criterion is from information theory. The information content can be measured using the conditional entropy of $\Theta$ given observation y, which in information theory is the number of bits to fully describe $\Theta$ given the observation y. It is easy to show that the conditional entropy is det($R'_\Theta$), which in principle is similar to equation (6).

Given the information content $\epsilon$, the goal of the planner 102 is to find a production plan P, or equivalently the bit vector H, to maximize the information content produced after running plan P on the production system 108. The evaluation of information content is easy, but the search is difficult. In practice, there are constraints on action preconditions and module connectivities that H has to comply. However, to gain insight, a much simpler problem is addressed first: if there is no constraint, what would be the best H to maximize information content?

For example, consider the simplified case where we have only two actions A and B. Without loss of generality it is assumed that $$\overline{R_\theta}^t = \begin{pmatrix} 1 & \rho \\ \rho & 1 \end{pmatrix}.$$

Here $\rho$ is the correlation coefficient, taking value $-1 \leq \rho \leq 1$, zero if and only if A and B are independent. For this system, the planner 102 has three choices, listed in Table 1.

TABLE 1

Plan choices and information content

| Plan | H | Info.Content |
|---|---|---|
| A | [10] | $\varepsilon_A = \dfrac{1+\rho^2}{1+\sigma_n^2}$ |
| B | [01] | $\epsilon_B = \epsilon_A$ |
| AB | [11] | $\varepsilon_{AB} = \dfrac{2(1+\rho)^2}{2+\sigma_n^2}$ |

Notice the following:
- When $\rho=0$, it is clear that path AB is the best choice in terms of information content.
- When $\rho$ is close to $-1$, path A (or equivalently path B) is more preferable than path AB.
- The switching point of $\rho$ is decided by $\sigma_n^2$. It is easy to specify the exact switching point. Furthermore, notice that as $\sigma_n \to 0$, the switching point is $\rho=0$.

For a situation where A and B are initially independent, the analysis above suggests that AB is optimal. Taking this path, it is observed that the sum of delay over A and B will make the two modules negatively correlated. The next step will favor path A (or equivalently B) over AB due to the negative correlation. Observing A's (or B) individual delay will decrease the correlation between A and B, hence making $\rho$ smaller. At some point of time, the path AB will be favored again. The path search will alternates between the long path AB and individual components (A or B).

1.2 InfoCollect: A Greedy Strategy for Constructing H Without Path Constraints

Note the structure of the information content equation (6). H is a bit vector, taking value 0 or 1 depending on whether an action is involved in the production plan. The binary-valued H simplifies the computation significantly. The term in the numerator H $\overline{R_\theta}$ is the selected row sum of the covariance matrix $\overline{R_\theta}$, summing over rows with index $i \in P$. The term in the denominator H $\overline{R_{74}}H^t$ is the grid-sum, summing over all grid points $\{(i, j), i, j \in P\}$.

Given the information criterion, the planner 102 needs to decide how to search for the optimal path. For this task, all of the constraints on H are ignored, and a greedy algorithm named InfoCollect is performed. InfoCollect is a greedy strategy which constructs the plan P to maximize the information content produced by equation (6). The algorithm starts with an empty plan P=. Then, it incrementally decides which action to add to P by comparing the benefit of including any single module k into the path and greedily selecting the one with maximum $\epsilon$ value. The procedure repeats examining all undecided actions, until further including any single action will decrease the overall $\epsilon$. This is illustrated in Algorithm 1.

---

Algorithm 1: InfoCollect algorithm

---

Input: Covariance Matrix $\overline{R_\theta}$, noise variance $\sigma_n^2$

Output: (1) Optimal bit vector H and (2) the corresponding information content $$\varepsilon = -\frac{\|H\overline{R_\theta}\|^2}{H\overline{R_\theta}H^T + \sigma_n^2}$$

begin
    Included node set: P ← ∅
    Undecided node set: U ← $A_{sys}$
    Initial score: e ← 0
    while U ≠ ∅ do
        for all i ∈ U do
            Construct $P_{tmp}$ by including i into P;
            Compute information content $e_i$ using $P_{tmp}$;
        end
        if max($e_i$) > e then
            Find the action i* producing max($e_i$);
            e ← max($e_i$);
            Modify set: P = P ∪ i*, and U ← U\i*;
        else
            U ← ∅
        end
    end
    Generate bit vector H from plan P;
    Output bit vector H and information score $\epsilon$ ← e.
end

---

InfoCollect is greedy in nature. The results produced by InfoCollect have been compared to a true optimal plan (the "oracle plan") in a lab environment. To do the comparison, the InfoCollect greedy strategy is implemented and applied to a set of randomly generated covariance matrices. On average, among the $2^M$ (M=10 in the simulation) possible plans, about 7% of the plans are better (giving larger $\epsilon$) than the plan picked by InfoCollect. The oracle plan gives a $\epsilon$ that is roughly 55% larger than that produced by InfoCollect. Overall, the InfoCollect may be considered as a quick-and-dirty way of estimating information content. The computation complexity of InfoCollect is $O(M^2)$, where M is the total number of actions. This is much more efficient than the naive strategy of comparing all possible plans, which has complexity $O(2^M)$. The saving is apparent. Furthermore, the computation of $\epsilon$ is incremental. This is due to the computational structure: the numerator is the row-sum, therefore adding a new module corresponds to adding a new row to the existing row-sum. Likewise, the denominator is a grid-sum of R, and can also be computed in an similar incremental fashion.

The InfoCollect algorithm assumes a fully reachable graph and does not respect network constraints. In practice, a node may only reach a subset of nodes. Such routing constraints limit the choices of production plans. The optimal (in fact suboptimal) plan generated by InfoCollect may not be feasible.

2. Searching

The objective of pervasive model adaptation is to use the model adaptation engine's 106 beliefs to influence production plans to gain additional information about the delays of individual actions.

In a planning system where actions have conditions, actions are only applicable if the conditions are satisfied. Therefore the underlying graph is not fully connected which was assumed in InfoCollect. In order to find a suitable algorithm for finding a plan which maximize the information criterion (6), given the constraints of the action conditions, a best-first search algorithm has been designed. The best-first search algorithm keeps a moving frontier of best nodes to expand, until a goal state is reached. The algorithm expands and reorders nodes based on the information criterion calculated in equation (6).

Best-first search requires a search node evaluation function that estimates the quality of a node relative to other search nodes in the frontier. If the evaluation function is optimal, then the best-first search becomes optimal. In order to maximize the information content, an estimate of the information gain collected by a plan is needed. Thus, three sets of actions are pre-computed and the InfoCollect procedure is modified accordingly.

The three action sets are:

$$\begin{cases} Succ_a & \text{set of successor actions} \\ Pre_a & \text{set of precessor actions} \\ NC_a = \mathbb{A}_{sys} \setminus (Succ_a \cup Pre_a) & \text{set of actions not connected} \end{cases} \quad (6)$$

After the InfoCollect algorithm is modified, it will give a close-to-optimal estimate of how much information can be collected given a partial plan P and the last action in that plan $\alpha_l$. The algorithm is modified by changing the input bit vector H:

$$\begin{cases} H_i = 0 & \text{for } i \in \mathbb{A}_{sys} \setminus (S_{\alpha_l} \cup P) & \text{unreachable actions} \\ H_i = 1 & \text{for } i \in P & \text{already visited actions} \\ H_i = -1 & \text{for } i \in S_{\alpha_l} & \text{reachable actions ahead} \end{cases} \quad (7)$$

InfoCollect can be used to select which undecided actions (those with $H_i=-1$) to include in order to maximize the information content calculated by equation (6). The InfoCollect algorithm is now modified such that if an undecided action a is selected the actions in its corresponding $NC_\alpha$ are exonerated (set to $H_i=0$).

Figure 7:
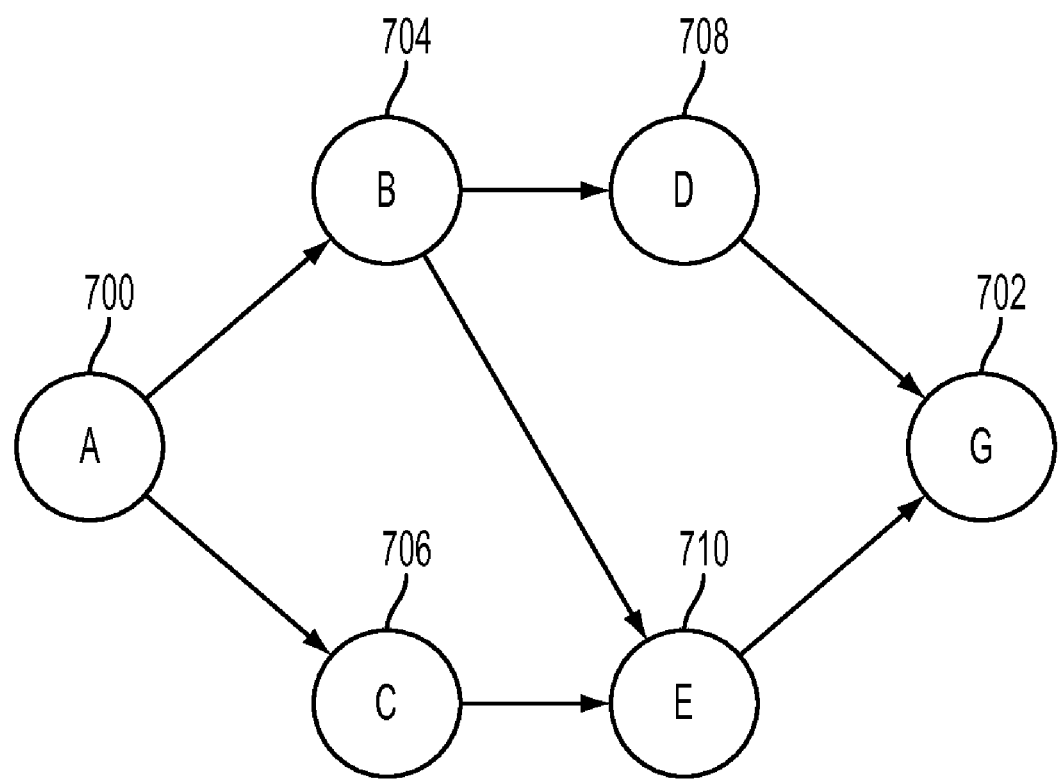
FIG. 7 illustrates an example directed graph that may be output by the constraint module of FIG. 2.

Consider the simple example graph in FIG. 7. A plan P must start at state A 700 and reach goal state G 702. Initially, a plan P starting at state A 700 has two choices for the next state: B 704 or C 706:

If going to B 704: the visited action set is P={$\alpha_{A,B}$}. The reachable set is $Succ_\alpha=\{\alpha_{B,D}, \alpha_{B,E}, \alpha_{D,G}, \alpha_{E,G}\}$. The non-reachable set is $\{\alpha_{A,C}, \alpha_{C,E}\}$. Using InfoCollect, we can estimate the information content, denote as $\epsilon_{AB}$.

If going to C 706: the visited action set is $P_2=\{\alpha_{A,C}\}$. The reachable set is $Succ_\alpha=\{\alpha_{C,E}, \alpha_{E,G}\}$. The non-reachable set is $\{\alpha_{A,B}, \alpha_{B,D}, \alpha_{B,E}, \alpha_{D,G}\}$. Using InfoCollect, we can estimate the information content, denote as $\epsilon_{AC}$.

If $\epsilon_{AB} > \epsilon_{AC}$, then going to B 704 is a better choice The best-first search expands the path AB first, and maintains the frontier {AB, AC} as a sorted list. At this point, D 708 and E 710 are compared using the same InfoCollect mechanism to compute information content $\epsilon_{ABD}$ and $\epsilon_{ABE}$. Now the frontier contains path ABD, ABE, AC, sorted based on their respective information content value. The procedure repeats until a plan the goal state G 702 is reached.

It is to be noted that although a best-first search algorithm is used, maximum optimality is not guaranteed. The reason is that the estimate generated by InfoCollect is not always admissible. It would have to always overestimate the information content to be admissible. In one sense, it tends to overestimate: Although the best-first search returns complete plans, InfoCollect does not obey the complete plan constraint, hence the evaluation stops including actions at a local information gain maximum, producing higher information content estimate than feasible.

Without intending to limit the scope of the exemplary embodiment, the follow Example demonstrates an implementation of the method.

EXAMPLE

To evaluate the practical benefits of pervasive model adaptation, the evaluation algorithm InfoCollect is implemented in a real world situation. An existing model-based planner and adaptation engine are combined with an adaptation engine and tested on a model of a modular digital printing press domain. The modular digital printing press is designed with multiple pathways to parallelize production using specialized print engines for specific sheets (spot color).

The planner receives a job from the job queue and creates a plan that will complete the job. It then sends the plan to a simulation of the printing press. The simulation models the physical dynamics of the paper moving through the system. Plans that execute on this simulation will execute unmodified on the physical prototype machines in the laboratory. The simulation determines the observation of the plan given the set of drifting actions. If the plan is completed without any delay and deposited in the requested finisher tray, it is said that the plan succeeded in time, otherwise the plan execution failed or was delayed in time.

The original plan and the observed delay (delay might be zero) of the plan execution are sent to the adaptation engine. The engine updates the uncertainty belief model. When uncertainty occurs in the belief model, the planner greedily searches for the most informative plan. Because there is a delay between submitting a plan and receiving the observation, the production jobs from the job queue are planned without optimizing for information gain until the observation is returned. This keeps productivity high.

The practical benefits of pervasive model adaptation were evaluated in two experiments. In experiment 1, the information gain of four different information seeking approaches were compared. Experiment 2 analyzed the long-term productivity of four different production strategies.

Experiment 1—Information Gain

The performance of four approaches are compared using the same model adaptation scheme, but with each approach different in their way of seeking information:

Regular model adaptation (passive) which uses regular production plans (not optimized for model adaptation) to seek information. Hence, it is passive in its information collection strategy.

Uniform model adaptation, which generates production plans with the objective to use all components of the system uniformly in usage count to seek information.

Pervasive model adaptation, which generates informative production plans using the approach described in detail above to seek information. Hence, it actively probes the parts of the system with highest uncertainty for information collection while, at the same time, achieving production goals.

Dedicated model adaptation, which generates informative test plans using the approach described in detail above to seek information, but does not produce any products. Dedicated model adaptation has fewer constraints (no production constraints) to obey than pervasive model adaptation. This results in more informative plans due to the bigger plan space.

The experiment was repeated 200 times for each model adaptation approach. Within each experiment, six actions were chosen to drift in execution duration, and 40 "plan, execute, observe, update" cycles were performed.

Figure 8:
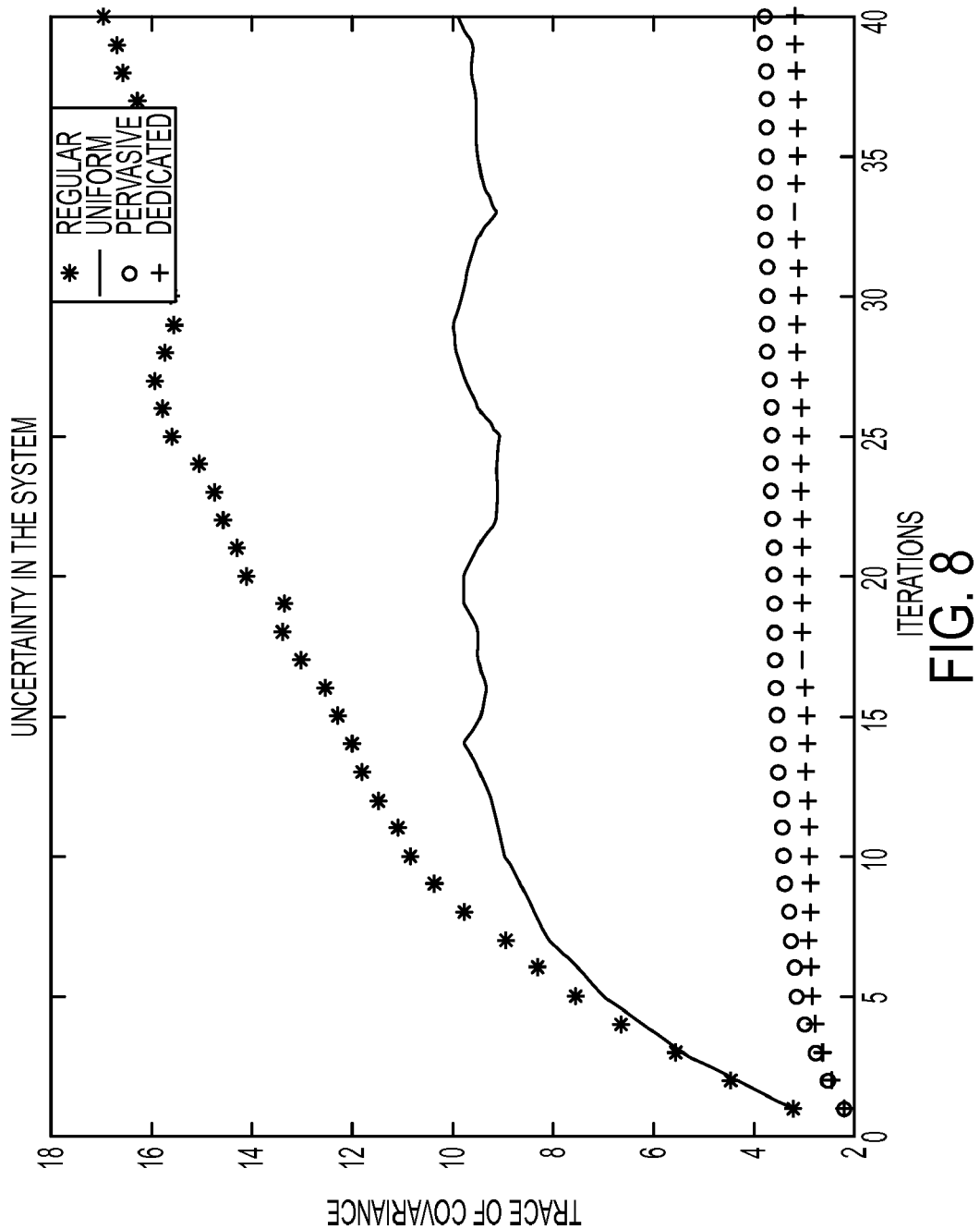
FIG. 8 is a chart comparing the performance of regular, uniform, pervasive, and dedicated model adaptation methods.

The results of the experiment are in FIG. 8. The figure shows on the x-axis the number of performed "plan, execute, observe, update" iterations and on the y-axis the uncertainty as the trace of the covariance matrix ($tr(R_\theta')$) in unit time squared. The uncertainty is introduced by the six actions with drifting delay. Since Regular model adaptation is not at all optimized for adaptation, it generates plans which, in general, do not provide enough information for the adaptation engine. FIG. 8 shows that the uncertainty accumulates over time and Regular fails in limiting it. Uniform performs much better than Regular due to the partial optimization for information gathering, but finally fails in keeping the uncertainty on a steady state. In general Uniform will fail if the redundancy is high in the system. Pervasive optimizes the production plan for information gain which results in low uncertainty in the system. This can only be dominated by Dedicated due to the fewer constraints. Note that Dedicated will not produce products. Overall it is shown that due to the active information gain optimization, Pervasive and Dedicated perform very well in controlling the uncertainty.

Experiment 2—Long Term Productivity

In the second experiment, four production strategies are compared to assess their performance in long-term productivity. The four strategies use the same model adaptation schemes, but differ in their method of production and information seeking. Before the four different strategies are explained, a maximum uncertainty level maxU is defined, above which the goal is switched from production to information seeking. This switching avoids downtime due to failures.

Regular w/dedicated. Regular production runs until the maximum uncertainty maxU is reached, whereupon the strategy switches to dedicated information seeking.

Uniform w/dedicated. Uniform production aims to use all components of the system uniformly (by usage count). It runs until the maximum uncertainty maxU is reached, whereupon the strategy switches to dedicated information seeking.

Pervasive. Production using pervasive model adaptation, which generates informative production plans using the approach described in detail above to seek information.

Regular w/pervasive. Regular production until the maximum uncertainty maxU is reached, whereupon the strategy switches to production using pervasive model adaptation.

The experiment was repeated 200 times for each production strategy. Within each experiment, six actions were chosen to cause to drift in execution duration. Each strategy performed 30 seconds of "plan, execute, observe, update" cycles. The production and test rates were set to vary among the production strategies: regular production 3.1 sheets/sec, uniform production 2.0 sheets/sec, pervasive production 1.9 sheets/sec and dedicated information seeking 2.8 test sheets/sec. Note that dedicated information seeking does not produce valid products. Regular production has was set at the highest production rate because it is optimized for throughput. The second highest production rate was given to dedicated information seeking since it does not have to obey production constraints. Pervasive production has the lowest rate because it obeys production constraints while optimizing for information gain.

Figure 9:
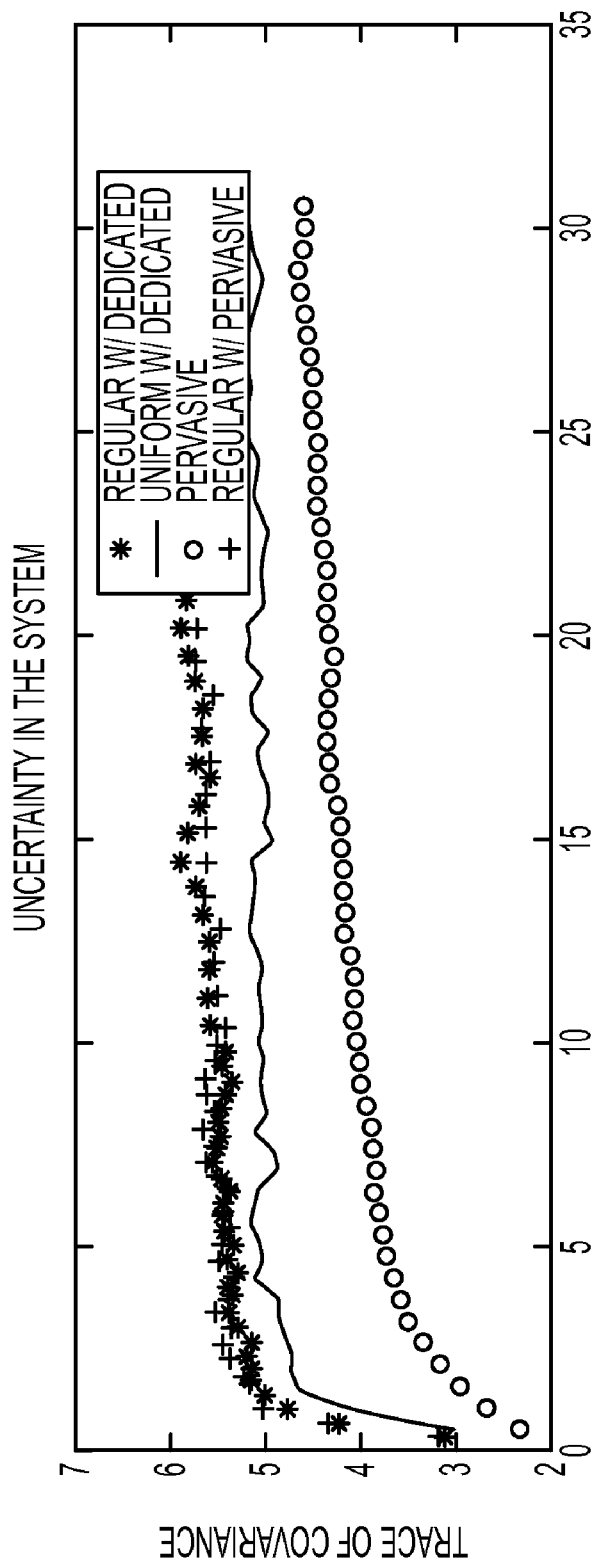
FIGS. 9 and 10 are charts comparing uncertainty and productivity, respectively, of four different production strategies.
Figure 10:
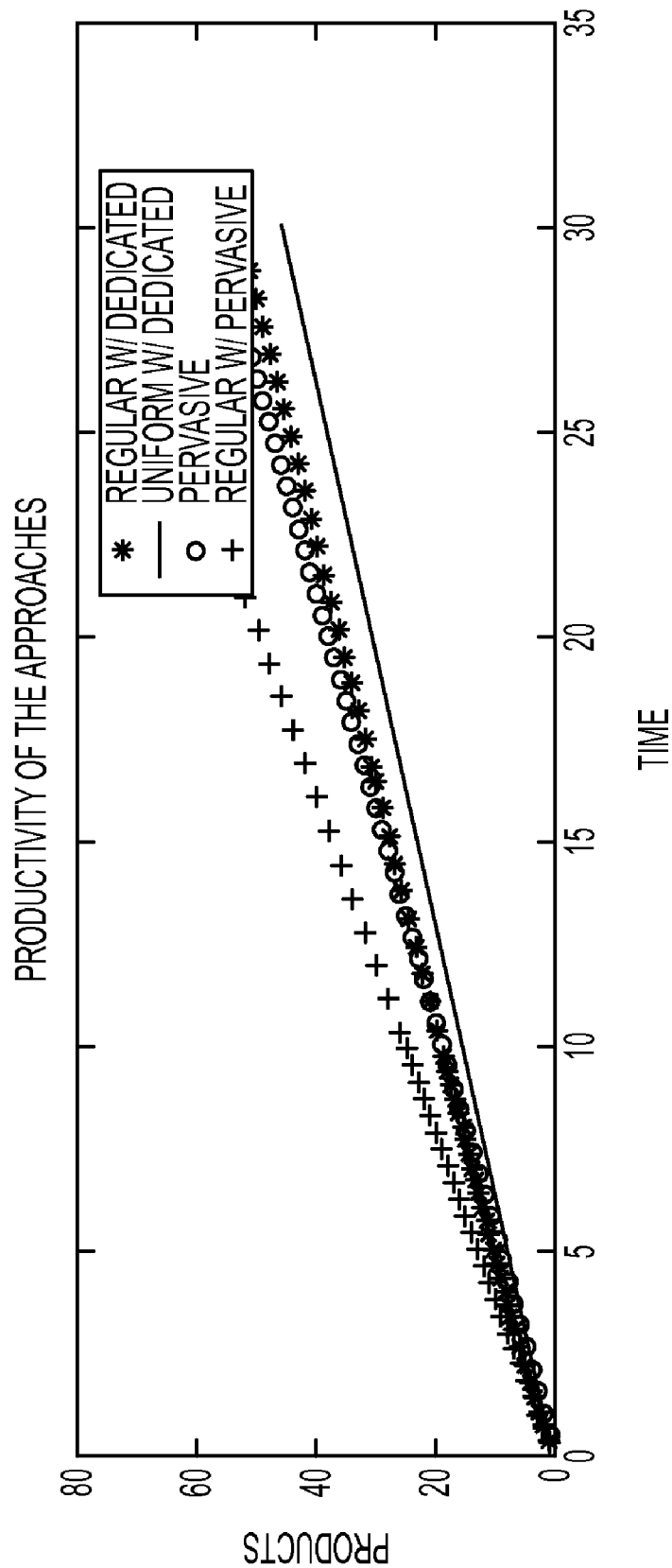

The results of the experiment are illustrated in FIGS. 9 and 10. FIG. 9 shows the uncertainty in the system as the trace of the covariance matrix in unit time squared. All four strategies, except production using pervasive model adaptation, grow in uncertainty relatively fast until a steady state of uncertainty is reached. This is due to the fact that the strategy is switched to dedicated information seeking if the uncertainty reaches maxU. Because the results are averaged over 200 experiments, the steady state of uncertainty stays under maxU. The distance to maxU indicates the amount of information gain provided by the strategies in their production mode. Pervasive model adaptation stays far under maxU due to its strong focus on good information seeking.

FIG. 10 shows the productivity of the production strategies as productions per time. The results show that uniform w/dedicated has the lowest productivity. This results from the strategy being optimized for neither throughput nor information seeking. Regular w/dedicated and Pervasive perform in a similar way. Whereas Regular w/dedicated production has high throughput but provides low information gain, Pervasive has low through-put but provides high information gain. In the experiments, it can be seen that these effects cancel each other out. Regular w/pervasive combines the strength of both Regular w/dedicated and Pervasive and performs the best. Overall, the best strategy is to focus on throughput until the uncertainty grows to the maximum limit maxU and then switch to informative production plans provided by pervasive model adaptation until the uncertainty drops.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A computer-implemented method for pervasive model adaptation, comprising:

providing a production plan to a production system, the production plan including a sequence of actions;

executing the production plan in the production system;

collecting observation data produced by at least one sensor in the production system during execution of the production plan into a computer memory;

calculating changes to be made to a system model in the computer memory based on the collected observation data;

dynamically updating the system model according to the calculated changes;

creating an updated production plan based at least partially on the dynamically updated system model; and storing the updated production plan within the computer memory;

wherein the system model is a representation of what is believed to be true about the production system;

wherein the production plan and dynamically updated production plan are optimized to provide optimal productivity while concurrently or substantially simultaneously optimized to provide maximum information content value for dynamically updating the system model;

wherein the creating an updated production plan based at least partially on the dynamically updated system model comprises:

creating a directed graph based on internal constraints of the production system;

performing a best-first search algorithm on the directed graph by utilizing an information content function as the evaluation function for the best-first search algorithm to produce a path that maximizes information content; and setting the path produced by the best-first search algorithm as the updated production plan; and, wherein the information content function utilizes a Kalman filter.

2. The method of claim 1, wherein the best-first search algorithm is an A* graph search algorithm.

3. A computer-based system for pervasive model adaptation, comprising:

at least one memory including computer executable instructions embodying:
(i) a model adaptation engine configured to:
receive observation data produced by at least one sensor of a production system and
calculate changes to be made to a system model of the production system based on the received observation data from the production system;
(ii) a system model module adapted to dynamically update the system model based on the calculated changes from the model adaptation engine, and
a planner module adapted to update production plan based at least partially on the updated system model from the system model module, the production plan including a sequence of actions; and,
at least one processor executing the computer executable instructions;
wherein the planner module includes:
a constraint module configured to generate directed graph based on internal constraints of the production system;
an information criterion module configured to generate heuristics based on the system model; and
a search module configured to update a production plan based on the directed graph from the constraint module and the heuristics from the information criterion module;
wherein the search module is adapted to:
perform a best-first search algorithm on the directed graph generated by the constraint module by utilizing an information content function as the evaluation function for the best-first search algorithm to produce a path that maximizes information content; and
set the path produced by the best-first search algorithm as the dated production plan; and
wherein the information content function utilizes a Kalman filter.

4. The system of claim 3, wherein the production plan updated by the search module is optimized for both productivity and maximum information content value.

5. The system of claim 3, wherein the best-first search algorithm is an A* graph search algorithm.

6. A computer-based system for pervasive model adaptation, comprising:

at least one memory including computer executable instructions embodying:
(i) a model adaptation engine configured to:
receive observation data produced by at least one sensor of a production system, and
calculate changes to be made to a system model of the production system based on the received observation data from the production system;
a system model module adapted to dynamically update the system model based on the calculated changes from the model adaptation engine; and
a planner module adapted to update a production plan based at least partially on the updated system model from the system model module; and
at least one processor executing the computer executable instructions;
wherein the production plan updated by the planner module is optimized for both productivity and maximum information content value;
wherein the planner module includes:
a constraint module configured to generate a directed graph based on internal constraints of the production system;
an information criterion module configured to generate heuristics based on the system model; and
a search module configured to update a production plan based on the directed graph from the constraint module and the heuristics from the information criterion module;
wherein the search module is adapted to:
perform a best-first search algorithm on the directed graph generated by the constraint module by utilizing an information content function as the evaluation function for the best-first search algorithm to produce a path that maximizes information content; and
set the path produced by the best-first search algorithm as the updated production plan; and,
wherein the information content function utilizes a Kalman filter.

7. The system of claim 6, wherein the best-first search algorithm is an A* graph search algorithm.

8. The system of claim 6, wherein the production plan includes a sequence of actions of the system model.

* * * * *